United States Patent
Kilburn

[15] 3,667,242
[45] June 6, 1972

[54] APPARATUS FOR INTERMITTENTLY PRODUCING CARBON DIOXIDE SNOW BY MEANS OF LIQUID CARBON DIOXIDE

[72] Inventor: Robert William Kilburn, Lake Wales, Fla.
[73] Assignee: RWK Development Co., Lake Wales, Fla.
[22] Filed: Sept. 15, 1969
[21] Appl. No.: 857,743

[52] U.S. Cl. .................................... 62/10, 62/35
[51] Int. Cl. .......................................... F25j 1/00, F25j 5/00
[58] Field of Search ....................................... 62/8, 9, 10, 35

[56] References Cited

UNITED STATES PATENTS

| | | | |
|---|---|---|---|
| 1,546,682 | 7/1925 | Slate | 62/10 |
| 1,843,397 | 2/1932 | Marcus | 62/10 |
| 1,872,689 | 8/1932 | Dickson | 62/8 |
| 2,027,382 | 1/1936 | Justheim | 62/8 |
| 3,443,389 | 5/1969 | Townsend | 62/10 |
| 3,492,829 | 2/1970 | Stanford | 62/10 |
| 1,974,478 | 9/1934 | Weber | 62/35 |
| 1,974,681 | 9/1934 | Maiuri | 62/35 |

FOREIGN PATENTS OR APPLICATIONS

| | | | |
|---|---|---|---|
| 890,062 | 2/1962 | Great Britain | 62/10 |

*Primary Examiner*—Norman Yudkoff
*Assistant Examiner*—Arthur F. Purcell
*Attorney*—Wenderoth, Lind & Ponack

[57] ABSTRACT

Apparatus particularly embodying an improved snow horn for producing carbon dioxide snow in a controlled intermittent manner upon demand. Liquid $CO_2$ is directed under predetermined conditions of pressure and temperature into an upper portion of a hollow double side walled cylindrical horn member provided with an open bottom and preferably a closed top, the latter having a solenoid actuated dispensing valve disposed adjacent thereto with an expansion nozzle connected thereto and projecting down into the horn. An annular area above the liquid $CO_2$ inlet in the horn is utilized within the hollow well or chamber to collect bubbles of $CO_2$ gas which may be introduced therewith. The liquid $CO_2$ is removed from the bottom of the annular chamber to assure exit therefrom only of the liquid $CO_2$ as by insulated pipe and introduced into the nozzle via the solenoid valve. The nozzle via minute holes therein preferably imparts a swirling tangential movement to the $CO_2$ snow formed by the sudden expansion of the liquid $CO_2$. The liquid $CO_2$ entering in the annular chamber is subcooled by the tangential swirl or vortex-like action of the mixture of snow and gas, to an extent to cause any bubbles in the liquid $CO_2$ to condense back into liquid form. The overall arrangement thereby assures that only liquid $CO_2$ enters the expansion nozzle to assure positive controlled formation of $CO_2$ snow at all times, even though the action of the solenoid dispensing valve is intermittant and/or off for considerable periods of time.

12 Claims, 3 Drawing Figures

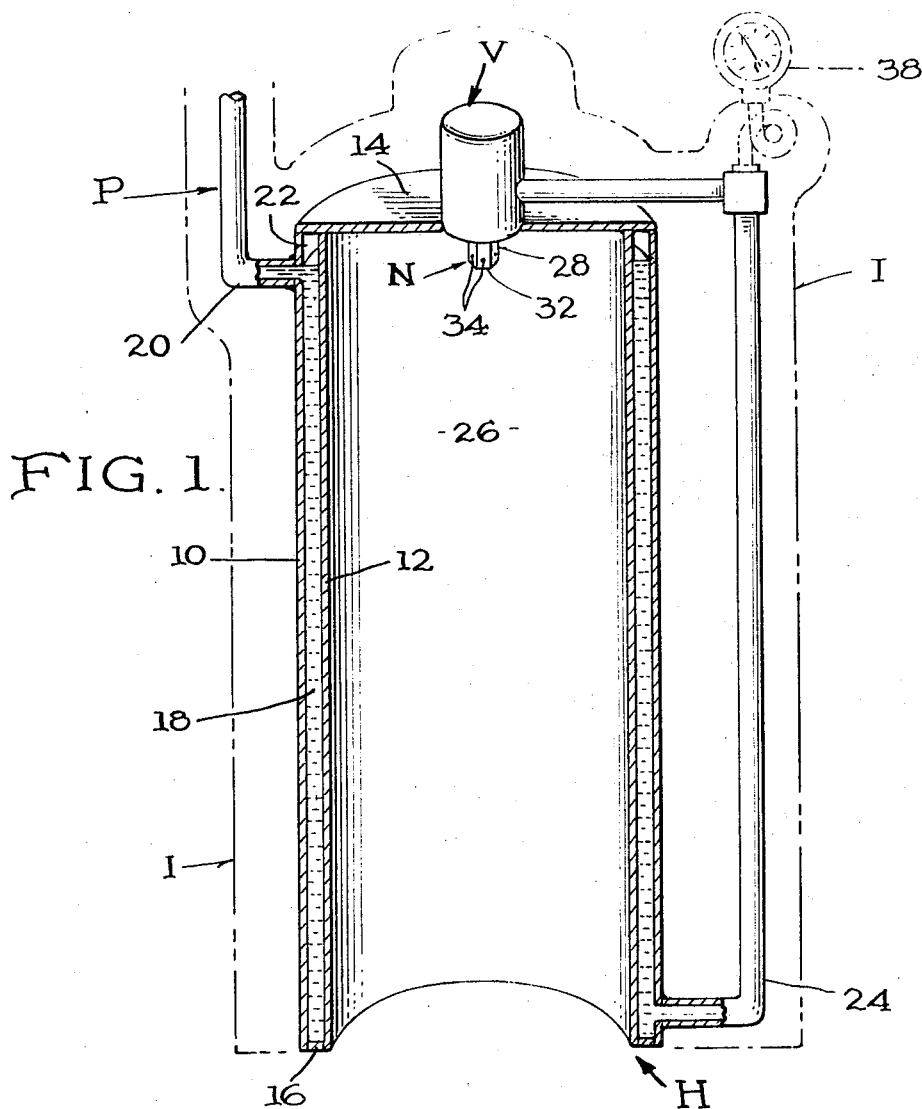
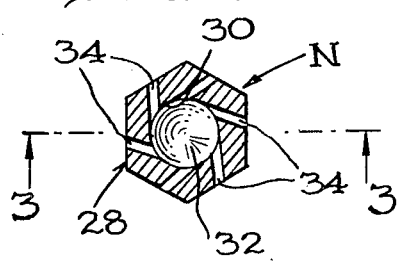
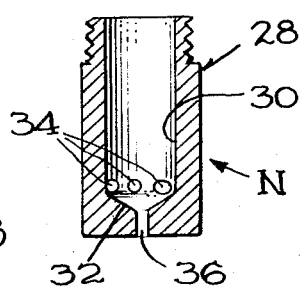

APPARATUS FOR INTERMITTENTLY PRODUCING CARBON DIOXIDE SNOW BY MEANS OF LIQUID CARBON DIOXIDE

BACKGROUND OF THE INVENTION

The present invention relates to apparatus for producing carbon dioxide snow, and more particularly to an improved snow horn to assure positive controlled intermittent and/or continuous production of the $CO_2$ snow upon demand as required.

In the past there has not been much, if any, demand for the intermittent production of $CO_2$ snow, which production heretofore has presented a more difficult problem. Presently, various factions of the food industry have increased need for the $CO_2$ snow. Food which is prepared and frozen is treated in various ways with the $CO_2$ snow. Particularly, a greater need has evolved in the citrus fruit industry for the intermittent use of $CO_2$ snow or slush, which is deposited in predetermined quantities both for direct intermixing with the fruit sections being canned or bottled, and/or for application upon and around containers of the fruit as an interim means of preserving same while being conveyed and stacked in shipping cartons or drums, and the like, to be ultimately transported or stored under suitable refrigerated conditions.

Usually liquid carbon dioxide is stored under pressure of carbon dioxide gas, dependent upon the temperature of storage. Generally, large bulk storage of carbon dioxide liquid is made possible by maintaining $CO_2$ gas under proper pressure and temperature or refrigeration conditions. The storage tanks are maintained at 0° F. with the pressure at 300 lb. per square inch. When the pressure exceeds this value, a compressor is activated to draw off excess carbon dioxide gas, which is re-liquefied by cooling the compressed carbon dioxide. The tanks are well insulated to reduce heat pick-up, and liquid $CO_2$ at 0° F. and 300 lb. per square inch pressure is piped to the point of use. If the pressure is reduced below 300 lb. per square inch or the temperature is raised above 0° F., a portion of the liquid turns into gas. Therefore, pipe lines are very well insulated. At the point of use, the liquid carbon dioxide is converted to a mixture of snow and gas by rapid expansion through a small orifice, and the attendant sudden reduction of the pressure thereof. Solid dry ice is made by compressing the $CO_2$ snow formed by this expansion process. A simple expansion orifice works satisfactorily for the continuous production of $CO_2$ snow, but intermittent production of $CO_2$ snow presents a more difficult problem. This is because if the liquid $CO_2$ feeding the snow making device warms up unduly while the flow is stopped, a bubble of gaseous $CO_2$ forms in the pipe just ahead of the nozzle with orifices therein. Accordingly, when the bubble hits the orifices, no snow is able to be formed until the gas is completely expelled. Or the orifices may stop up due to deposit of moisture in the system under these conditions. It is apparent that this condition produces a sputtering, or discontinuous production of snow which is unsuitable for most uses, particularly where a positive deposit of $CO_2$ snow in loose or slush form is required upon packaged perishable produce passing intermittently therebeneath.

SUMMARY OF THE INVENTION

Accordingly, it is the primary object of the present invention to provide an improved $CO_2$ snow horn and related apparatus for reliable and positive production of $CO_2$ snow each and every time the demand arises, whether on a continuous or intermittent basis.

Another object of the invention is to provide apparatus for fully reliable controlled intermittent production of $CO_2$ snow which eliminates detrimental formation of $CO_2$ gas in the lines at the dispensing or injecting nozzle of the snow horn.

Yet another object is to provide improved $CO_2$ snow forming apparatus which may be disposed vertically or horizontally.

These and other objects and advantages are achieved by the provision of an elongated open bottomed preferably cylindrical snow horn member embodying a pair of spaced and sealed annular side walls. The end opposite the open bottom end is preferably fully closed by a top wall having a solenoid actuated dispensing or injection valve mounted thereon, and further including an expansion nozzle connected with said valve and projecting generally centrally down into the horn. Alternatively, the top portion of the horn may be left open and suitable structure disposed in association therewith to support the valve at least near to, and the nozzle within, the upper portion thereof. The liquid $CO_2$ is led from a suitable storage source via an insulated conduit into the walled chamber of the upper portion of the horn formed by the spaced walls leaving an area above the inlet for collection of possible gas bubbles which may form or be entrained therewith, said liquid $CO_2$ then filling the annular chamber and leaving at the lower end adjacent the open bottom of the horn. The liquid $CO_2$ is then piped to the solenoid valve on top and injected, upon suitable valve actuation, into the upper end of the horn via the injection or expansion nozzle which is of a form to preferably impart a swirling motion to $CO_2$ snow and resultant gas formed by the sudden expansion and attendant reduction in pressure of the liquid $CO_2$. The expansive, swirling and centrifugal action of the snow and gas against the cylindrical walls serves to subcool the incoming liquid $CO_2$ to the extent to condense any bubbles which may have formed back into liquid, and thereby assuring that only liquid $CO_2$ is fed to and enters the expansion nozzle.

Where continuous manufacture of the snow is desired, it is to be understood that the solenoid or equivalent valve would not be required and could be omitted.

DESCRIPTION OF DRAWINGS

The present invention will be better understood from the following detailed description together with the accompanying drawings illustrative of one preferred embodiment of the invention, wherein:

FIG. 1 is a semi-schematic representation shown partially in cross-sectional perspective of the improved snow horn and related apparatus of this invention;

FIG. 2 is a detail of a preferred form of nozzle; and

FIG. 3 is a detail of another preferred form of nozzle.

PREFERRED EMBODIMENT

Referring generally to the drawings wherein like reference characters designate like parts throughout the drawings, H broadly designates the horn device, having suitable piping or conduits P connected therewith and to the dispensing, solenoid operated valve V affixed to the top of the horn H. An expansion nozzle is designated N and is connected with the valve V in the upper end of the horn H. Suitable insulation I is provided to assure the proper temperature and liquid condition of the $CO_2$.

More specifically, referring to FIG. 1, the horn H comprises a double annular walled cylindrical member formed as by disposing a 1 foot length of heavy gauge 3 ½ inch diameter stainless steel pipe 10, uniformly spaced within and relative to a like length of 4 inch diameter pipe 12, with both being attached to a top closing plate 14, as by welding. An annular plate member or bead of weld 16 joins the lower peripheries of pipes 10 and 12, and together with top plate 14 serves to define the annular chamber 18 therebetween which receives the liquid $CO_2$, piped from a suitable reservoir (not shown) under the high pressure. The tubing or pipe members forming the liquid $CO_2$ receiving chamber of the snow horn, and the associated conduiting must be of sufficiently heavy gauge to withstand the operating pressure, usually of 300 lb. per sq. inch, under which the liquid $CO_2$ is used. In the illustrative form, the chamber may be only from one-sixteenth to one-eighth inch between the spaced walls.

The piping P includes an inlet conduit 20 connected to the horn near to but spaced a relatively small distance below the top wall or plate 14. Bubbles of gas which may be entrained with or formed within the liquid $CO_2$ as it is introduced into the chamber 18 then stay at the top of the liquid and collect in the portion 22 of said chamber above the inlet conduit 20.

The piping P further includes an outlet conduit 24 which connects with the chamber 18 adjacent the lower portion of the horn and preferably, but not necessarily, diametrically opposite the inlet conduit 20. Outlet pipe 24 serves as the liquid $CO_2$ removal pipe for directing the liquid $CO_2$ to the solenoid valve V mounted perferably centrally atop the horn H. The solenoid valve V is of a small, conventional commercially available type, such as manufactured by the Automatic Switch Company of Florham Park, New Jersey, and, when properly wired in a power circuit, functions to selectively call for or to completely stop the flow of liquid $CO_2$ via conduit 24 to the nozzle N, which as operatively connected with said valve projects downwardly and preferably into the upper center of the horn chamber designated 26. The outlet pipe 24 may be connected slightly above the very bottom wall or plate 16 for ease in fabrication or to provide a collection area for any sediment which may be entrained with the liquid $CO_2$ within the conduit system. Further, a suitable pressure gauge 38 shown in broken outline in FIG. 1 may be installed adjacent the valve V to assure that the horn is operating under optimum pressure conditions.

Nozzle N may be fabricated from any suitable heavy duty material, such as from a length of hexagonal steel bar stock comprising a body 28, FIGS. 1 and 2, which is drilled axially, as at 30, substantially the full length thereof leaving it open only at the end connecting it with the valve V. At the closed end 32, minute apertures 34 are drilled generally transversely to the length, but preferably in an angular manner to the vertical axis of the nozzle so that the $CO_2$ dispensed from said expansion nozzle leaves in a tangential manner. The apertures 34 serve as the restriction orifices for the sudden expansion of the chilled liquid $CO_2$ from its high pressure into a combined gaseous and solid state form at atmospheric pressure, which in so doing, by using this improved apparatus, effectively refrigerates a greater portion (approximately two-third) of its weight to $CO_2$ snow flakes. The balance (approximately one-third) which reverts to gas is dissipated to the atmosphere. The snow flakes being heavier than the gas portion settle outwardly and downwardly of the horn responsive to the combined centrifugal force and gravity, whereupon the snow flakes or particles are deposited selectively and sequentially as required, such as by a trip lever actuation (not shown) of the valve responsive to engagement of the trip lever by a produce package or container being conveyed for passage beneath the snow horn H. It is to be understood that other means may be utilized to create a vortex-like action of the snow, as by the peripheral disposition of one or more inlet nozzles in the snow forming chamber. The inertia of the vortex motion imparted to the snow helps to dispense it over the product. Lowering and raising of the horn H relative to the product being treated will effect the range of dispersal of the snow for a given requirement.

FIG. 3 shows another form of nozzle which is the same as the foregoing except for the provision of one or more generally axially directed orifices 36 in the otherwise closed end portion of the nozzle. The use of this modified nozzle will assure added downward thrust and increased fill capabilities of the $CO_2$ snow flakes or particles.

It is well known that the colder the space within which the solidification of the liquid $CO_2$ occurs, or the colder that the product is, the greater will be the production by weight of the snow. Accordingly, the tangential radial dispensing of or exit from the nozzle N causes the mixture of snow and gas to swirl in a vortex-like manner against and confined by the inner annular wall of the horn H to thereby subcool the liquid $CO_2$ within the annular chamber, with the further result that any gas bubbles which may have been entrained therein are condensed back into the liquid form, which would not be achieved by the mere precooling as by the cool revert gas being directed to embrace the incoming liquid conduit means. During this subcooling, the heat is transferred through the inner wall 12 of the horn.

Further, the strategic placement of the inlet pipe, as aforesaid at the upper portion, together with that of the outlet pipe at the lower portion, assures that only liquid $CO_2$ is allowed to enter the expansion nozzle, even though the action of the dispensing solenoid valve is intermittent, and/or closed off for a considerable period of time. It is further understood that the entire assembly is well insulated, as shown schematically at I, to reduce heat intake.

OPERATION OF PREFERRED EMBODIMENT

While the operation is believed to be readily apparent from the foregoing detailed description, it will be briefly reviewed.

Liquid $CO_2$ is directed from a suitable storage source (not shown) via insulated conduiting whereby it enters the annular chamber 18 of the snow horn by conduit 20 near the upper portion thereof. As the liquid fills the well-insulated annular chamber 18, any gas bubbles which may have formed are collected atop of liquid, as in the upper portion designated 22. Therefore, only liquid $CO_2$ is drawn off by the outlet pipe 24 adjacent the bottom 16 of said annular chamber 18, and from there is introduced into the apertured expansion nozzle N by the selective action of the solenoid valve V. The very cold liquid $CO_2$, usually at a temperature of 0° F., is ejected from the expansion nozzle into the expansion or snow-forming area defined by the innermost annular wall of the horn where it is permitted to quickly expand at atmospheric pressure to solidify into $CO_2$ snow flakes. The tangential outward swirl of the snow flakes and revert or residual gas against the annular wall 12 of the chamber 18 serve to further subcool the liquid $CO_2$ entering said chamber, and to recondense any $CO_2$ gas bubbles which may have become entrained therein. The novel concept is believed to reside in a combination of the said strategic placement of the relative inlet and outlet pipes together with the subcooling feature which assures that a smooth flow of only liquid $CO_2$ is introduced at all times into the expansion nozzle, thereby providing a reliable means for the intermittent formation of $CO_2$ snow upon demand.

It is apparent from the foregoing that an improved snow horn and attendant apparatus has been evolved which achieves the advantages and objects set forth in the preamble hereof.

What is claimed is:

1. Apparatus for producing carbon dioxide snow substantially instantaneously upon demand from a supply of liquefied carbon dioxide stored under predetermined conditions of high pressure and very low temperature, said apparatus comprising in combination:
    a. a snow-forming horn with a circumferential annular uninterrupted liquid carbon dioxide receiving chamber completely surrounding an open bottomed, carbon dioxide snow-forming chamber,
    b. said horn having an upper and lower end, and having inlet and outlet means in association with said receiving chamber,
    c. means including an expansion nozzle having at least one minute orifice directed into the upper end of said horn for the introduction of liquid carbon dioxide and the subsequent expansion thereof through said nozzle and orifice to form carbon dioxide snow flakes in said snow-forming chamber;
    d. said inlet means including an inlet pipe near but spaced below the upper end of said receiving chamber for introducing liquefied carbon dioxide from said storage supply into said receiving chamber; means supplying liquid carbon dioxide to the inlet means;
    e. said outlet means including an outlet pipe near the bottom end of and for removal of the liquefied carbon dioxide from said annular receiving chamber, and further including conduit means outside of said annular chamber connecting said outlet pipe with said nozzle, and
    f. said nozzle and both of said chambers of said horn being relatively disposed so that the forming carbon dioxide snow impinges against said receiving chamber to further subcool it and the liquid therein and to also recondense into liquid any carbon dioxide gas bubbles which may have been entrained or formed therein, and the relative disposition of said inlet and outlet means in combination therewith together assuring only liquid carbon dioxide is fed to said nozzle at all times thereby assuring positive substantially instantaneous formation of said snow upon demand.

2. Apparatus as defined in claim 1 wherein a space in said liquid receiving chamber is provided above the inlet pipe thereto, to facilitate the collection of any carbon dioxide gas bubbles atop the liquid in said chamber which may become entrained in the inlet means.

3. Apparatus as defined in claim 1 further including a valve interposed in the conduiting between the outlet pipe of said liquid receiving chamber and said nozzle, said valve including means to facilitate selective operation to effect forming of the snow as required.

4. Apparatus as defined in claim 3 wherein said nozzle includes a body having a central passage connected with said valve.

5. Apparatus as defined in claim 3 wherein said nozzle includes a body having a central passageway connected with said valve, and further including a plurality of minute orifices formed to generally tangentially expel the carbon dioxide snow particles against the snow forming chamber to impart a vortex-like motion to same.

6. Apparatus as defined in claim 3 wherein said valve is of an automated character with means for remote operation thereof, activated by demand or lack of demand for the carbon dioxide snow.

7. Apparatus as defined in claim 6 wherein said valve is a solenoid actuated valve, and including electrical circuit means interconnecting same with a suitable electrical power source.

8. Apparatus as defined in claim 1 wherein said horn together with said inlet and outlet means are provided with sufficient insulation to preclude undue warming of said liquid carbon dioxide and the attendant formation of gas bubbles which would detrimentally affect the operation of the apparatus.

9. Apparatus as defined in claim 1 wherein said nozzle includes a body portion having a central passageway connected at one end with said conduit means of paragraph (e) and a plurality of minute expansion orifices formed in an opposite and otherwise closed end of said body portion, and through which orifices the pressurized liquid carbon dioxide is permitted to quickly depressurize and expand thereby forming the very cold carbon dioxide snow or particles.

10. Apparatus as defined in claim 9 wherein the central passageway of the nozzle is vertically disposed generally coaxially with said snow-forming chamber, and said orifices are disposed generally radially to the central axis thereof and generally tangentially with respect to said central passageway, whereupon impingement of the formed snow particles against the liquid receiving chamber imparts a vortex-like action to the said snow particles.

11. Apparatus as defined in claim 9 wherein at least one of the orifices is disposed to expel some carbon dioxide snow in a downwardly and generally axial direction of the snow horn.

12. Apparatus for producing carbon dioxide snow substantially instantaneously upon demand from a supply of liquefied carbon dioxide stored under predetermined very low temperature and high pressure conditions, said apparatus comprising in combination:
  a. a normally vertically disposed, rigid, snow-forming horn having:
    1. continuous inner and outer circumferential, spaced side walls forming therebetween a generally annular uninterrupted receiving chamber for the liquid carbon dioxide directed thereto, said chamber having an upper and lower end;
    2. the inner wall defining a central snow-forming chamber which is completely surrounded by said uninterrupted receiving chamber;
    3. means closing the upper end of at least the liquid receiving chamber, and
    4. means closing only the lower end space between said side walls and leaving said snow-forming chamber open at said lower end thereof and from which the carbon dioxide snow as formed therein is directed;
  b. a fluid dispensing valve disposed atop said snow-forming horn and means for actuating said valve;
  c. conduit means connecting the supply of liquid carbon dioxide to the snow horn, including:
    1. an inlet conduit connected with an inlet pipe on and near the upper end of said horn; means supplying liquid carbon dioxide to said inlet pipe; and
    2. an outlet conduit connecting an outlet pipe adjacent the bottom end of said annular uninterrupted receiving chamber with said valve atop said horn;
  d. an expansion nozzle having;
    1. a body with a central passage therein and having an open end connecting said passage with said valve;
    2. a closed end opposite the open end, said closed end projecting into an upper portion of said snow-forming chamber; and
    3. minute, restrictive orifices provided in said closed end of the nozzle and through which the pressurized liquid carbon dioxide is permitted to rapidly expand under conditions of a much lower, generally atmospheric pressure, to partially solidify into carbon dioxide snow flakes or particles, and to partially revert to a gaseous form; and
  e. said nozzle being disposed relative to said chamber to facilitate impinging engagement of said snow particles and revert gas against the side wall of the chamber to subcool said liquefied carbon dioxide receiving chamber and liquid therein to the extent that any carbon dioxide gas formed therein is recondensed back into liquid form.

* * * * *